United States Patent Office 3,565,812
Patented Feb. 23, 1971

3,565,812
PROCESS FOR PREPARING A MIXTURE
OF POLYESTERS
James J. Anderson and Vasco G. Camacho, Richmond,
Va., assignors to Mobil Oil Corporation, a corporation
of New York
No Drawing. Filed Sept. 29, 1967, Ser. No. 671,572
Int. Cl. C07f 9/02; C09k 3/00
U.S. Cl. 252—182                                        7 Claims

ABSTRACT OF THE DISCLOSURE

A mixture of polyesters is obtained by reacting together, in essentially a one-step reaction, maleic anhydride, tetrahalophthalic anhydride, pentaerythritol, a mixture containing dimethyl hydrogen phosphate and methyl dihydrogen phosphate, and propylene oxide. The mixture of polyesters is a mixture of monomeric polyester polyols having low acid numbers. The product obtained is useful in the preparation of polyurethanes.

In addition, a polyurethane composition containing therein the product mixture is provided. The polyurethane composition may, among other things, be used in coatings, as packaging, or as insulation in buildings, truck or railroad car bodies or in airplane fuselages.

CROSS REFERENCES TO RELATED APPLICATIONS

U.S. application Ser. No. 404,165, filed Oct. 15, 1964, now U.S. Pat. No. 3,459,733, and U.S. application Ser. No. 536,978, filed Mar. 24, 1966, now U.S. Pat. No. 3,465,068, described processes for preparing the separate components of the polyester mixture disclosed in the present application.

BACKGROUND OF THE INVENTION

Field of the invention

This invention relates to a process for forming mixtures of monomeric polyester polyols, and to compositions thereof with organic polyisocyanates. More particularly, it relates to a process for forming mixtures of monomeric polyester polyols having low acid numbers by reacting dicarboxylic acid anhydrides, polyhydroxy compounds and alkylene oxides, and to polyurethane compositions thereof.

Summary of the prior art

It is known in the art that polyhydroxy compounds will react with anhydrides to yield compounds containing one or more carboxylic acid residues. See U.S. Pat. 3,053,830 and U.S. Pat. 3,219,657. It is also known that alkylene oxides will react with the active hydrogen of polyhydroxy compounds to yield materials having therein one or more oxyalkylene groups per hydroxyl function. See U.S. Pat. 3,098,065. Additionally, it is known that alkylene oxides will react with carboxyl groups giving a compound having ester derivatives with terminal hydroxyl groups.

Further, U.S. Pat. 3,089,863 teaches the use of polyhydroxy compounds as initiators in making polymeric resins from carboxylic acid anhydrides and alkylene oxides. Since alkylene oxides will not, even under the most severe conditions, react with an acid anhydride, it is necessary to use, as an initiator in the reaction, a minor quantity of a polyhydroxy compound. Thus, anhydride and monoepoxide monomers add alternately to the initiator, and the resulting product has an alternating network of polymeric substituents, leading to chain extension and to high molecular weight linear or branched polymers, depending on the functionality of the initiator.

The process of the present invention is an improvement over prior art processes in that (1) essentially monomeric polyester polyols are obtained and (2) the mixtures thereof an be obtained in essentially a one-step reaction. In view of the complex nature of the reactions which one would normally expect even when one anhydride, one polyhydroxy compound and an alkylene oxide are reacted, it would not be evident from any of the above art, or any other art known, that a reaction mixture containing two or more anhydrides, two or more polyhydroxy compounds and an alkylene oxide would yield a product mixture containing only discrete compounds.

So far as the use of conventional polyols in the production of polyurethanes is concerned, their use is so well known that no specific art need be cited here. It need only be said that no art is known which teaches a combination which is so effective in polyurethanes that it shows superior flame spread resistance in one of the most stringent flame tests set forth by the American Society for Testing Materials. The test is designated E 84–61.

SUMMARY OF THE INVENTION

In accordance with the present invention, there is provided a process for the preparation of a product mixture comprising, as the predominant components thereof, compounds of the formulas (1)
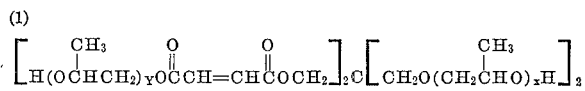

(2)
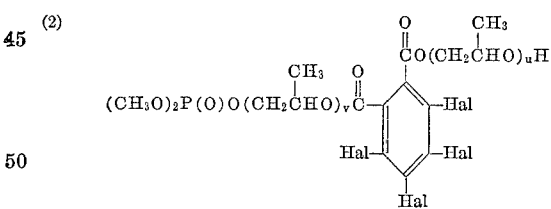

and

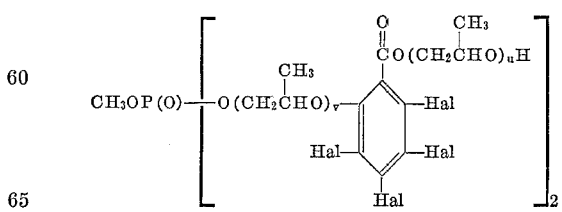

wherein $u$ is from about 1 to about 3, $v$ is from about 1 to about 3, $x$ is from 0 to about 1, $y$ is from about 1 to about 2, and Hal is halogen, which comprises reacting, in essentially a one-step reaction, maleic anhydride, pentaerythritol, tetrahalophthalic anhydride, a mixture containing approximately equimolar amounts of methyl dihydrogen phosphate and dimethyl hydrogen phosphate, and propylene oxide. There may be present in said product the free propylene oxide product of methyl dihydrogen phosphate and dimethyl hydrogen phosphate, wherein each active hydrogen has reacted with from 1–3 equivalents of propylene oxide.

In addition there is provided a polyurethane comprising the reaction product of a polyisocyanate and: (a) a product mixture comprising, as the predominant components thereof, compounds of the Formulas 1 and 2 above; (b) a sucrose polyether polyol having an average of about 8 to about 10 moles of propylene oxide per mol of sucrose; and (c) at least one low molecular weight glycol.

The polyurethanes of this invention will be useful in diverse applications where the special characteristics afforded by the mixture of the instant process are needed. For example, they will be especially useful in the building industry for wall insulation, or as insulation in aircraft fuselages and truck bodies.

DESCRIPTION OF SPECIFIC EMBODIMENTS

The amount of the anhydride to be reacted with the polyhydroxy compound will depend upon the functionality of the polyhydroxy compound or the number of such functions which are to be reacted with the anhydride. However, it is essential in the process of the present invention that the amount of hydroxyl groups present will always at least equal the amount of anhydride present, i.e., there will never be stoichiometrically fewer moles of hydroxyls in the polyhydroxy compounds than anhydride present in the reaction mixture to insure that all the anhydride is combined with the polyol to form an acid reaction product. For example, if pentaerythritol is the polyol, not less than 0.25 mol would be used when 1.0 mole of anhydride, such as maleic anhydride, is present in the mixture. There may, however, be more hydroxyl groups present than there is anhydride to react therewith.

The following describes a generalized process for preparing the specific monomeric polyester polyols of the mixture. The description is provided here in order to show the properties of a mixture of the individual products made separately, and to establish a basis for showing the equivalency of the product obtained by mixing and reacting all of the ingredients used in preparing the individual components separately.

The separate compounds which form the mixture of the process of the present invention may be produced by either a single-step process or a two-step process. In the single-step process, the dicarboxylic anhydride, polyhydroxy compound, and the alkylene oxide are placed together within a pressure chamber and reacted at a temperature of from about 70° C. up to about 160° C. The actual temperature used will be governed by the particular anhydride and polyol being reacted. The alkylene oxide is present in excess, preferably in a molar ratio of from about 2 to about 3 times the number of acid functions which are being neutralized. Thus, if one mol of pentaerythritol and one mol of phthalic anhydride are reacted, one carboxyl or acid function will be present to react with the oxide. It will then be sufficient to have from about 2 to about 3 mols of alkylene oxide present in the reaction chamber. The ingredients are then subjected to sufficient heat to commence the reaction, which, once begun, is allowed to proceed exothermally until little of the polyhydroxy compound remains unreacted in the mixture. The mixture is continuously stirred throughout the reaction. The temperature, on exotherm, may be as high as 160° C., but usually from about 130° C. to about 150° C. The time of the reaction will vary from about two to twenty hours, depending upon the particular reactions and the number of mols of anhydride to be reacted with the polyhydroxy compound. After the exothermic reaction is completed, the temperature is preferably lowered to about 110° C. to complete the neutralization of the acid functions formed during the initial reaction. The excess oxide is removed in vacuo.

The product made in this single-step process is similar in all respects to the same product made from the same reactants by the two-step process to be described below, further indicating that low molecular weight monomeric polyesters, rather than long-chain polymers, are formed.

If the temperature of the reaction is permitted to exceed about 160° C., it will have a detrimental effect on the product. Since it is known that high temperatures are required for esterification, it necessarily follows that the higher the temperature, the greater the chance for a carboxyl group to be esterified by reaction with the polyhydroxy compound being used. Therefore, temperatures at which esterification will occur should be avoided.

With respect to the two-step process, the initial reaction occurs between the polyhydroxy compound and the anhydride, and the reaction can be conducted at a lower temperature than is necessary in the one-step process. For example, in the case of maleic anhydride and pentaerythritol (see Example 1, below), one hydroxyl opens the anhydride ring, generating a free carboxyl group. Since there is no alkylene oxide present, one of the remaining OH's of the polyhydroxy compound must react with another anhydride. Thus, the chain-extending sites are capped, leaving only the carboxyl groups from the anhydride nucleus and the remaining hydroxyls as sites for reaction with the alkylene oxides. Thus, the initial reaction to form the dicarboxylic acid ester may be run at virtually any temperature from about 70° C. to below the temperature at which esterification would occur. The important thing is to have the proper proportions of anhydride and polyhydroxy compounds necessary to give the desired product. Once the acid is formed, alkylene oxide is reacted therewith, and here also the temperatures used are not critical. However, while temperatures of 110° C. to 130° C. are preferred, the reaction may be carried out at temperatures as high as 150° C. to 160° C., with no adverse effects on the resulting product.

Notwithstanding the ease with which separate monomeric products may be prepared by the above generally discussed process, one skilled in this art would certainly expect an extremely complex system of reactions to occur upon mixing two anhydrides, two hydroxyl-containing compounds, and an alkylene oxide. One would expect the two anhydrides to compete with the two hydroxyl compounds to give all possible products. One would also expect reaction between the alkylene oxide and hydroxyl compounds, so that the reactant combining with the anhydride would have varying oxyalkylene chain lengths attached thereto. That none of these appear to occur to any appreciable extent is surprising.

The following is one explanation for the obtainment of discrete chemicals in the mixture. It will be understood that the explanation is offered merely as one possibility, and that no limitation should be placed upon the invention thereby, since it is merely a presumption. There may well be other reasons, and one of them may be closer to the actual mechanism of the reaction.

Obviously, there can be no mutual anhydride bond rupturing between the two anhydrides. Also, the possibility is remote that either anhydride bond reacts with the acid phosphate present. As the reaction mixture is heated to reaction temperature, maleic anhydride melts (at 60° C.), and although pentaerythritol is a solid at the maleic anhydride melting point, it reacts therewith, so that when the temperature reaches 90–100° C., all or essentially all of the maleic anhydride-pentaerythritol reaction is complete, leaving tetrabromophthalic anhydride as the only solid remaining.

At this point the tetrabromophthalic anhydride could dissolve in the product formed thus far, so that there is a possibility of its reacting with the said product or with any remaining pentaerythritol. Experimental evidence, however, has shown that little, if any, tetrabromophthalic anhydride actually dissolves or reacts with the initial product. Also, experiments have shown that if even a small amount of pentaerythritol reacts with tetrabromophthalic anhydride, a gel will result. No gelling, however, was observed in the reaction mixture.

When propylene oxide addition is begun, the first reaction thereof is with the methyl acid phosphate. If reaction occurred between the acid functions present on the initial product and propylene oxide, the possibility of the resulting product reacting with tetrabromophthalic anhydride would exist also, but it is evident from the nature of the final mixture obtained in the inventive one-step reaction that this does not occur, or if it does, the degree of reaction is negligible. Thus, as the propylene oxide product of methyl acid phosphate is formed, it preferentially reacts with tetrabromophthalic anhydride. Finally, all acid functions are neutralized, and the mixture prepared in this way is in all respects like the blend of the separate materials.

The inventive process may be run at temperatures within the range of about 70° C. to, but not including the temperature at which esterification can occur. For the purposes of this specification, esterification is defined as the interaction between one of the carboxyls formed initially and pentaerythritol. Generally, the reaction is run at from about 70° C. to about 130° C., preferably at from about 70° C. to about 110° C. Times of reaction are not especially critical except insofar as economics are concerned. It may be completed in as short a time as two to three hours, or it may take as long as 10 hours or more.

Except for the temperature considerations, the reaction is very simple in operative techniques, and no extraordinary precautions need to be taken with respect to obtainment of the product. The reaction proceeds smoothly in the presence of excess oxide, preferably in a molar ratio of from about 2 to about 3 times the number of all acid functions (both from reactants and the products formed) to be neutralized, yielding a light colored viscous product in essentially quantitative yield.

The following will specifically illustrate the one-step process of the invention. It will be understood that it is illustrated only and that modifications thereof occurring to those skilled in the art will be within the scope of this invention.

EXAMPLE 1 (ATMOSPHERIC PRESSURE)

Into a suitable apparatus equipped with stirring means, means for gas addition, and heating means were placed 65.1 parts of maleic anhydride, 47.2 parts of pentaerythritol, 310.5 parts of tetrabromophthalic anhydride, 106.0 parts of methyl acid phosphate, (43.9% dimethyl hydrogen phosphate and 50.7% methyl dihydrogen phosphate with a total acid of 12.09 meq./gram) and 1.5 parts of sodium formate (as a color inhibitor). The mixture was stirred and heated to 70° C. over a period of 20 minutes. The addition of propylene oxide was begun at this temperature, and the temperature rose to 95° C. in about two minutes. A total of 340 ml. of propylene oxide was added to the stirred mixture at 95–100° C. over a period of about four hours and forty minutes. The mixture was then heated for one hour at 95° C., and, without cooling, the excess oxide was stripped from the product mixture to a final vacuum of 10 mm. of Hg and a final pot temperature of 97° C.

EXAMPLE 2 (SUPERATMOSPHERIC PRESSURE)

For this run a two liter Parr pressure apparatus adapted for continuous gas feed and for stirring was used. The same amounts of maleic anhydride, pentaerythritol, tetrabromophthalic anhydride, methyl acid phosphate, and sodium formate as in Example 1 were used. After closing the apparatus, the mixture was heated to 80° C. over a period of 31 minutes with stirring. At the end of this time propylene oxide addition was begun, and a total of 375 ml. was added to the reaction mixture at 78–101° C. over a period of about two hours and forty minutes. While continuing to stir, the mixture was heated for an additional two hours and forty-five minutes at 90–100° C. During the addition of propylene oxide the pressure ranged from about 8 to about 60 p.s.i., the majority being between about 30 and about 60 p.s.i. After the aging period, the unreacted oxide was released gradually from the vessel until atmospheric pressure resulted. The excess oxide dissolved in the mixture was removed in vacuo to a final pressure of 10 mm. of Hg and a final pot temperature of 99° C.

The preparation of the separate components of the mixture and the properties of the blend are set forth below and compared with the properties of the mixture prepared in the above one-step reaction of this invention. For a more detailed description of the synthesis of the separate components, see the applications noted under "Cross References to Related Application."

EXAMPLE 3

(1) Under "Summary of Invention" was prepared as follows:

Into a two liter Parr pressure apparatus were placed 490.3 parts of maleic anhydride, 354.0 parts of pentaerythritol, 0.14 part of sodium formate and the mixture was heated to 90–95° C. and was continued at this temperature until the acidity reached 6.17 meq./gram, propylene oxide was fed into the sealed vessel by nitrogen pressure, allowing the temperature to increase to 125° C. at the start of the oxide addition. The 120–125° C. temperature range was maintained throughout the oxide addition. When addition was completed, the reaction was aged for 2.5 hours to obtain a product with low acidity.

After the aging period, the unreacted oxide was released gradually from the vessel. When atmospheric pressure resulted, the product was stripped at 120–125° C. and 10 mm. of Hg for 10 minutes to insure complete removal of the unreacted oxide. A light yellow viscous product was obtained.

EXAMPLE 4

(2) Under "Summary of Invention" was prepared as follows:

Into the same apparatus as discussed in Example 3 was placed 325.0 parts of tetrabromophthalic anhydride, 111.9 parts of methyl acid phosphate (containing 12.55 meq./gram of acid), and 1.6 parts of sodium formate. The reactants were heated to 70–80° C. and propylene oxide was fed under nitrogen pressure at such a rate that the temperature was maintained at 95–100° C. When oxide addition was completed the reaction mixture was aged at 95–100° C. for two hours. After the aging, unreacted oxide was gradually released from the vessel, and when atmospheric pressure was obtained, the product was stripped of remaining oxide at 100° C. and 10 mm. of Hg for 10 to 15 minutes. A slightly viscous liquid was obtained.

The table below is a comparison of various physical and chemical properties of the product using the one-step process with those of a physical blend of the separate products. The blend was prepared by mixing 20.5 parts of product (1) and 59.0 parts of product (2) such that the proportions thereof corresponded to the proportions of the same products in the mixture of the instant process.

TABLE I

| | Example 1 | Example 2 | Physical blend |
|---|---|---|---|
| Wt., total, g | 775.6 | 782 | 771.8 |
| Appearance | (1) | (2) | (3) |
| Total meq. acid | 2,683 | 2,683 | 2,683 |
| Oxide reacted, g | 245.3 | 241.7 | 243.0 |
| Total meq. oxide | 4,225 | 4,160 | 4,187 |
| Oxide/acid ratio | 1.58 | 1.55 | 1.56 |
| Calculated phorphorus, percent | 3.56 | 3.54 | 3.56 |
| Found | 3.50 | 3.43 | 3.56 |
| Calculated Br., percent | 27.6 | 27.35 | 27.6 |
| Found | 24.72, 25.22 | 26.58 | 23.73, 24.27 |
| Calculated OH, percent | [4] 194 | [4] 192 | [4] 194 |
| Found | 197 | 198 | 197 |
| Acid No | [4] 0.07 | [4] 0.09 | [4] 0.3 |
| Viscosity at 73° F., c.p.s | 152,000 | 176,000 | 180,000 |
| Specific gravity, 26° C | 1.5187 | 1.5191 | 1.5187 |

[1] Lt. yellow, very slight turbidity.
[2] Lt. golden-yellow, clear.
[3] Very lt. yellow, clear.
[4] Mg. KOH/g.

The mixture of the instant process or the physical blend of separate products, when further blended with a sucrose polyether polyol containing an average of from about 8 to about 10 oxypropyl groups per sucrose molecule and at least one polyalkylene glycol and incorporated into a polyurethane foam provides an extremely high degree of the resistance to flame spread as measured by the A.S.T.M. E 84–61 test method for measuring the surface burning characteristics of building materials. Both of the above mixtures produce polyurethane foams with flame spread rating of 25–30 as measured by the aforementioned ASTM test method. Many building code groups consider a flame spread rating of 25 or less as "noncombustible" and allow only this class of building materials to be used in public buildings requiring the highest rating for fire safety.

The polyurethanes which have improved flame properties imparted thereto by the polyols prepared by the inventive process are any of those which are prepared from suitable polyisocyanates, and other necessary materials. In general aspect, they are prepared using polyisocyanates, other polyols, blowing agents, surfactants and catalysts. More specifically, to make a cellular polyurethane foam the so-called one-shot method may be used, or alternatively, a portion or all of the polyol may be prereacted with an excess of polyisocyanate to give a prepolymer containing unreacted NCO groups prior to foaming. Normally, from about 5 to about 40% excess is used. the amount depending on the polyisocyanate, the viscosity desired, and the method of foaming. One method of foaming the polyurethane product includes the addition of water, a catalyst, a surfactant, and an additional active hydrogen compound, such as additional polyols, to the isocyanate or prepolymer. The water reacts with the free isocyanate, generating carbon dioxide which is trapped in the viscous mass as the reaction proceeds. The catalyst promotes the reaction of the polyisocyanates with hydroxyl groups and water to form the polyurethane polymer, and as the foaming mass expands and reaches the point of setting, it contains a plurality of tiny cells.

In another method of foaming, the cellular structure is obtained by using a low-boiling, inert liquid which is added at the same time as the catalyst, the surfactant and the additional active hydrogen compound. As reaction proceeds, heat is generated and the low-boiling, inert liquid is vaporized. This vapor is trapped in the viscous mass and setting takes place as mentioned above.

The scope of materials useful in the preparation of polyurethane foams will be illustrated in a nonlimiting way by the following members.

Suitable polyisocyanates for use in forming polyurethane compositions are either well known in the art, or the use thereof, in polyurethane systems would be understood, and they include aliphatic and aromatic polyisocyanates. Among these may be named m- and p-phenylene diisocyanates, 2,4- and 2,6-toluene diisocyanate, including mixtures thereof, p,p'-diphenyl diisocyanate, 1,5-naphthylene diisocyanate, and p,p'-diphenylmethane diisocyanate. Preferred polyisocyanates are the polymethylene polyphenylisocyanates represented by the general formula:

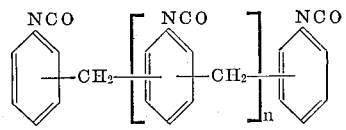

wherein $n$ represents an integer between 0 and 5.

Preferably, the polyisocyanates are used with polyhydroxy compounds in a NCO/OH ratio of about 1.03, but other ratios, such as those ranging from about 0.7 to about 1.4, should be useful also.

Low molecular weight glycol, as the expression is used herein, means glycols having a molecular weight of from about 90 to about 500. Included among these are glycerol, polyethylene glycol and polypropylene glycol.

The catalysts used in making the polyurethanes of this invention include tertiary amines such as triethylenediamine, tetramethylbritanediamine, triethylamine, triethanolamine, N-methylmorpholine, and the like, as well as metal compounds such as stannous octoate, zinc octoate, dibutyl tin dilaurate, and the like. Combinations of the two types may also be used.

Suitable blowing agents include the chlorofluoroalkanes, such as trichloromonofluoromethane, as well as other known agents having sufficiently low boiling points.

Any of the surfactants known to the art are useful in the practice of this invention. Included are the silicone oil surfactants such as the organo-silicone block polymers described in U.S. Pat. 2,834,748.

The following examples illustrate the use of the polyols of this invention in obtaining polyurethanes with high resistance to burning.

EXAMPLE 5

A "B" component was prepared by blending (a) 263 parts of a one-step product as described in Example 2, (b) 57.8 parts of an oxypropylated sucrose polyol having an hydroxyl number of 530 mg. KOH/gm., (c) 10.2 parts of polyethylene glycol having a hydroxyl number of 450 mg. KOH/gm., (d) 91.8 parts of trichloromonofluoromethane, (e) 2.0 parts of triethylenediamine, and (f) 4.0 parts of L–520 silicone oil surfactant, described in U.S. Pat. 3,251,785 as a dimethyl siloxane glycol copolymer of the formula

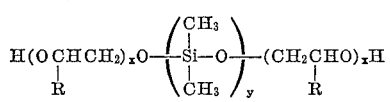

Ingredients (a), (b) and (c) were added together, heated to 80° C., blended by mechanical stirring for one hour. After cooling to room temperature, the other ingredients were blended at room temperature to produce the homogenous "B" component.

An "A" component was prepared by adding over a 10–15 minute period 6.3 parts of a oxypropylated sucrose polyol having a hydroxyl number of 450 mg. KOH/gm. to 243.7 parts of agitated polymethylene polyphenylisocyanate. Both materials were preheated to 80–90° C. prior to the addition, and the blend was agitated for one hour at 80–90° C. followed by cooling to room temperature. The polymethylene polyphenylisocyanate used above is a mixture represented by the formula

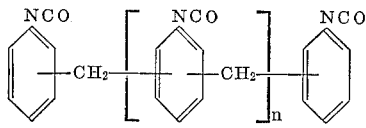

wherein $n$ ranges from about 0 to 2, and averages about 0.6.

A foam was prepared by machine mixing the A and B components in the ratio of 250 to 428.5 parts respectively. The mix stream was allowed to collect in a cardboard box, foam and cure overnight at ambient temperatures.

EXAMPLE 6

A "B" component was prepared by blending (a) 249.8 parts of the physical blend of individually prepared polyols as described in Table I, (b) 58.5 parts of the sucrose polyol as described in Example 5, (c) 10.3 parts of the polyethylene glycol as described in Example 5, (d) 89.5 parts of trichloromonofluoromethane, (e) 2.0 parts of triethylenediamine, and (f) 4.0 parts of the silicone surfactants as described in Example 5. The blending proceddure was essentially equivalent to that outlined in Example 5.

A foam was prepared according to Example 5 using the "A" component of that Example and the "B" component above in the ratio of 250 to 414 parts respectively.

The properties of the foams of Examples 5 and 6 are shown below.

|  | Example 5 | Example 6 |
|---|---|---|
| Density, pcf | 1.94 | 2.02 |
| Percent closed cells | 90.4 | 91.4 |
| Percent change in volume after exposure to 158° F., 95–100% RH for— | | |
| 2 days | +13 | +18 |
| 4 days | +16 | +19 |
| 7 days | +18 | +22 |
| 14 days | +27 | +30 |
| 28 days | +35 | +44 |
| Percent change in volume after 24 hour exposure to— | | |
| 110° C | +11 | +5 |
| 120° C | +25 | +21 |
| 130° C | +51 | +37 |
| 140° C | +7 | +8 |
| Flame Properties by ASTM E–84: [1] | | |
| Flame spread | 25.6 | 28.2 |
| Smoke density | 175 | 170 |
| Fuel contributed | ND | ND |
| Flame properties by ASTM D–1692–59T: | | |
| Classification | (2) | (2) |
| Total inches burned | 0.56 | 0.56 |

[1] Sample thickness of 1.0 inch.
[2] Non-burning.

It will be understood that the examples are illustrative only, and are not to be construed as imposing any limitation on the invention. Equivalent methods for making the compounds and equivalent methods for using them in polyurethanes will be deemed to be within the scope of the invention, limited only by the above disclosure and the scope of the appended claims.

We claim:
1. A process for the preparation of a product mixture consisting essentially of compounds of the formulas

(1)
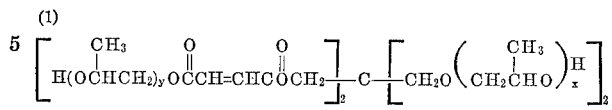

(2)
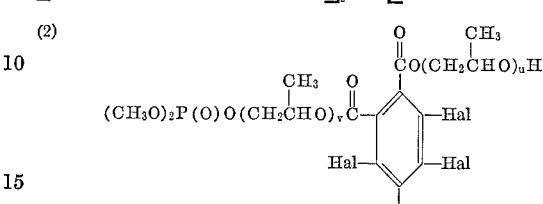

and (3)
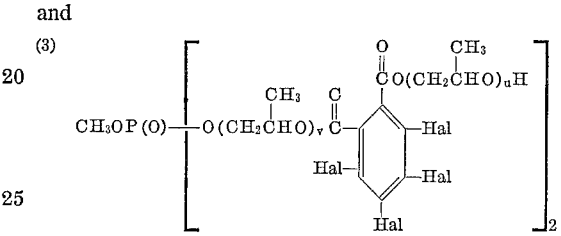

wherein $u$ is from about 1 to about 3, $v$ is from about 1 to about 3, $x$ is from 0 to about 1, $y$ is from about 1 to about 2, and Hal is halogen, which consists essentially of reacting, in a one-step reaction, maleic anhydride, an amount of pentaerythritol which is at least stoichiometrically equivalent to said maleic anhydride, tetrahalophthalic anhydride, a mixture containing approximately equimolar quantities of methyl dihydrogen phosphate and dimethyl hydrogen phosphate, and propylene oxide, the reaction being carried out at a temperature not exceeding about 160° C.

2. The process of claim 1 wherein there is present in said product the free propylene oxide reaction product of methyl dihydrogen phosphate and dimethyl hydrogen phosphate, wherein each active hydrogen has reacted with from 1–3 equivalents of propylene oxide.

3. The process of claim 1 wherein the tetrahalophthalic anhydride is tetrabromophthalic anhydride.

4. The process of claim 1 wherein the reaction is run within the temperature range of from about 70° C. to about 160° C.

5. The process of claim 3 wherein the temperature is within the range of from about 70° C. to about 130° C.

6. The process of claim 4 wherein the temperature is from about 70° C. to about 110° C.

7. The process of claim 1 wherein the propylene oxide is in excess of the amount required to neutralize all the acid functions present.

References Cited

UNITED STATES PATENTS 3,459,733  8/1969  Byrd, Jr., et al.  260—2.5X
3,465,068  9/1969  Camacho et al.  260—77.5X RICHARD D. LOVERING, Primary Examiner U.S. Cl. X.R.

260—2.5, 75, 77.5, 234, 952

PO-1050
(5/69)

UNITED STATES PATENT OFFICE
CERTIFICATE OF CORRECTION

Patent No. 3,565,812     Dated February 23, 1971

Inventor(s) J. J. Anderson and Vasco G. Camacho

It is certified that error appears in the above-identified patent and that said Letters Patent are hereby corrected as shown below:

In column 2, line 12, "an" should be -- can --. In column 7, Table 1, under Example 2, Acid No., "0 09" should be -- 0.09 --. In column 7, Table 1, under "Physical Blend" Viscosity at 73°F, add -- cps -- after "180,000". In column 7, line 46, the period after "used" should be a comma. In column 8, line 38, "tetramethylbritanediamine" should be -- tetramethylbutanediamine --. In column 9, line 16, "428.5" should be -- 428.8 --. In column 10, formula 3, that portion within the brackets, "$\overset{O}{\underset{C}{\overset{\|}{C}}}$" should be -- $\overset{O}{\underset{C}{\|}}$ --.

Signed and sealed this 17th day of August 1971.

(SEAL)
Attest:

EDWARD M. FLETCHER, JR.      WILLIAM E. SCHUYLER, JR.
Attesting Officer             Commissioner of Patents